United States Patent
Wang et al.

(10) Patent No.: US 12,323,937 B2
(45) Date of Patent: Jun. 3, 2025

(54) FREQUENCY OFFSET ESTIMATION METHOD FOR AVERAGE CONSISTENCY CLOCK SYNCHRONIZATION

(71) Applicant: Chongqing University Of Posts And Telecommunications, Chongqing (CN)

(72) Inventors: Heng Wang, Chongqing (CN); Liuqing Chen, Chongqing (CN); Pengfei Gong, Chongqing (CN)

(73) Assignee: Chongqing University Of Posts And Telecommunications, Chongqing (CN)

( * ) Notice: Subject to any disclaimer, the term of this patent is extended or adjusted under 35 U.S.C. 154(b) by 340 days.

(21) Appl. No.: 17/617,936

(22) PCT Filed: Nov. 15, 2019

(86) PCT No.: PCT/CN2019/118864
§ 371 (c)(1),
(2) Date: Dec. 10, 2021

(87) PCT Pub. No.: WO2021/056761
PCT Pub. Date: Apr. 1, 2021

(65) Prior Publication Data
US 2022/0369258 A1 Nov. 17, 2022

(30) Foreign Application Priority Data
Sep. 23, 2019 (CN) .......................... 201910900255.6

(51) Int. Cl.
*H04W 56/00* (2009.01)
*H04J 3/06* (2006.01)
(Continued)

(52) U.S. Cl.
CPC ......... *H04W 56/005* (2013.01); *H04J 3/0638* (2013.01); *H04L 25/024* (2013.01);
(Continued)

(58) Field of Classification Search
CPC .................................................. H04W 56/005
See application file for complete search history.

(56) References Cited

U.S. PATENT DOCUMENTS

2018/0041329 A1\* 2/2018 Wang ................ H04W 56/0035
2019/0207695 A1\* 7/2019 Aweya ................. H04J 3/0667
(Continued)

*Primary Examiner* — Abdeltif Ajid
(74) *Attorney, Agent, or Firm* — Michael D. Eisenberg

(57) ABSTRACT

The present invention relates to a frequency offset estimation method for average consensus-based clock synchronization, and belongs to the technical field of wireless sensor networks. According to the method, in combination with distributed one-way broadcast characteristics, solving of maximum likelihood estimation is converted into a linear optimization problem, and a relative frequency offset estimation value is obtained by adopting an iterative method. By applying the estimation value to the compensation of logic clock parameter between nodes, an effect of keeping logic clocks of network nodes consistent can be achieved. According to the present invention, distribution characteristics of communication time delay are fully considered, accurate relative frequency offset estimation can be implemented, so the synchronization precision of average consensus-based clock synchronization is effectively improved, the maximum likelihood estimation solving is performed by adopting the iterative method, an estimation algorithm is simplified, and storage overhead is reduced.

4 Claims, 3 Drawing Sheets

(51) Int. Cl.
*H04L 25/02* (2006.01)
*H04L 27/00* (2006.01)

(52) U.S. Cl.
CPC ....... *H04L 27/0014* (2013.01); *H04W 56/001* (2013.01); *H04L 2027/0026* (2013.01)

(56) References Cited

U.S. PATENT DOCUMENTS

| | | | |
|---|---|---|---|
| 2022/0085954 A1* | 3/2022 | Wang | H04L 5/0055 |
| 2023/0284157 A1* | 9/2023 | Quan | H04W 56/0015 370/350 |

* cited by examiner

FREQUENCY OFFSET ESTIMATION METHOD FOR AVERAGE CONSISTENCY CLOCK SYNCHRONIZATION

FIELD OF INVENTION

The present invention belongs to the technical field of wireless sensor network communications, and relates to a frequency offset estimation method in average consensus-based clock synchronization based on maximum likelihood estimation.

BACKGROUND ART OF THE INVENTION

Clock synchronization is a basic support technology for a wireless sensor network. Multiple applications and services, such as routing, dormant scheduling, data fusion, i.e. are operated on a basis of clock synchronization of nodes in the network. In recent years, a large number of researches have focused on solving a problem of clock synchronization in wireless sensor networks, among which the typical ones are RBS, TPSN, FTSP, and PBS protocols. These clock synchronization protocols are generally divided into two types: reference node-based clock synchronization protocol and distributed clock synchronization protocol. Compared with the reference node-based clock synchronization protocol, the distributed clock synchronization protocol has significant advantages of robustness, extensibility, etc. due to no need for any reference node. There into, consensus-based clock synchronization not only has the advantage of a distributed synchronization algorithm, but also can achieve high precision synchronization in the whole network.

In a communication process of a wireless sensor network, an occurrence of time delay is inevitable. The composition of the communication time delay may be divided into fixed time delay and random time delay, wherein the random time delay may be modeled as Gaussian distribution, exponential distribution, gamma distribution, etc. in different scenarios. However, in an early consensus-based synchronization protocol, it was assumed that information between nodes may arrive instantaneously, but the influence of time delay is ignored. If communication time delay is considered, a precise synchronization effect may not be achieved, or even synchronization cannot be achieved. The estimation precision of a relative frequency offset directly influences the performance of consensus-based clock synchronization. Therefore, RoATS, LSTS, NMTS and other consensus-based synchronization mechanisms improve a relative frequency offset estimation method to cope with the influence of time delay on a synchronization effect. Although bounded communication time delay is considered in these synchronization methods, no optimization is performed for distribution characteristics of the time delay.

At present, a clock synchronization mechanism in the wireless sensor network mainly has following problems: firstly, an existing consensus-based clock synchronization mechanism under time delay only considers bounded time delay but does not respectively consider a fixed part and a random part of time delay, causing inaccurate relative frequency offset estimation and limiting synchronization performance; secondly, no optimization is performed for a specific random time delay distribution type in consensus-based clock synchronization, while exponential random time delay conforms to accumulated link delay during point-to-point assumed reference linking, consensus-based synchronization under truncated exponential time delay has practical significance.

Therefore, there is an urgent need for a frequency offset estimation method which can make a network achieve accurate clock synchronization.

DISCLOSURE OF THE INVENTION

In view of this, the purpose of the present invention is to provide a frequency offset estimation method for average consensus-based clock synchronization. Aiming at a problem that a consensus-based clock synchronization mechanism cannot effectively converge when communication time delay exists, concentrating on fixed time delay and truncated exponential random time delay, and considering a distributed feature of a wireless sensor network, parameters of logic clocks of nodes are updated in combination with a consensus-based method, so that the network achieves an accurate clock synchronization.

To achieve the above purpose, the present invention provides following technical solution:

A frequency offset estimation method for average consensus-based clock synchronization, comprising: estimating a relative frequency offset between nodes by using a maximum likelihood estimation method, and realizing clock synchronization between nodes based on an average consensus-based clock synchronization method, so that logic clocks of the nodes in a network achieve a common global clock, including following specific steps:

S1: assuming that each node i in the network periodically broadcasts a local clock message $\tau_i(t_l^i)$, receiving, by a neighbor node j thereof, the clock message, recording a current local clock $\tau_j(t_l^{id})$ of the neighbor node, so the neighbor node establishes a relative clock relationship according to known local clock information and time delay due to influence of fixed time delay $d_{ij}^f$ and random time delay $d_{ij}^r(t_l^i)$ existing in a data packet transmission process:

$$\tau_j(t_l^{id}) = \omega_{ij}\tau_i(t_l^i) + \varphi_{ij} + d_{ij}^f + d_{ij}^r(t_l^i)$$

where $\omega_{ij}$ and $\varphi_{ij}$ respectively represent a relative frequency offset and a relative phase offset of the node i with respect to the node j, $d_{ij}^r(t_l^i)$ represents random communication time delay satisfying truncated exponential distribution of which an average value is $\lambda$ and an upper limit is D; $d_{ij}^f$ represents fixed time delay existing in the data packet transmission process;

S2: performing relative frequency offset estimation according to the relative clock relationship after the neighbor node j receives synchronization messages each cycle, wherein the node j receives L synchronization messages from the node i, the relative frequency offset $\omega_{ij}$ between nodes is estimated using a maximum likelihood estimation method:

$$\hat{\omega}_{ij} = \underset{\omega_{ij},\theta_{ij}}{\operatorname{argmax}}\ \exp\left(L\theta_{ij} + \omega_{ij}\sum_{l=1}^{L}\tau_i(t_l^i)\right),$$

$$\begin{cases} 0 < \tau_j(t_1^{id}) - \theta_{ij} - \omega_{ij}\tau_i(t_1^i) \le D \\ 0 < \tau_j(t_2^{id}) - \theta_{ij} - \omega_{ij}\tau_i(t_2^i) \le D \\ \vdots \\ 0 < \tau_j(t_L^{id}) - \theta_{ij} - \omega_{ij}\tau_i(t_L^i) \le D \end{cases}$$

where $\theta_{ij} = \varphi_{ij} + d_{ij}^f$.

Further, in step S2, nodes in the network periodically broadcast clock synchronization messages, a number of local clocks of the broadcast nodes is an integral multiple of a broadcast cycle T, so solving of the relative frequency offset $\omega_{ij}$ under maximum likelihood estimation is converted into a linear optimization problem:

$$\max z = \theta_{ij} + \frac{L+1}{2}T\omega_{ij},$$

$$\begin{cases} 0 < \tau_j(t_1^{id}) - \theta_{ij} - T\omega_{ij} \leq D \\ 0 < \tau_j(t_2^{id}) - \theta_{ij} - 2T\omega_{ij} \leq D \\ \vdots \\ 0 < \tau_j(t_L^{id}) - \theta_{ij} - LT\omega_{ij} \leq D \end{cases}.$$

Further, the estimation problem solving of the relative frequency offset under the maximum likelihood estimation method is simplified to a linear objective function with linear constraints, a feasible region of the objective function is a common region under constraint line $\omega_{ij}=(\tau_j(t_l^{id})-\theta_{ij})/lT$ and above constraint line $\omega_{ij}=(\tau_j(t_l^{id})-D-\theta_{ij})/lT$, the two clusters of constraint lines being formed according to a truncated boundary of time delay, an optimal value is located on a vertex of a feasible region boundary; by comparing intersection points of the constraint lines, only information of vertexes on the boundary is stored using an iterative method so as to reduce storage overhead, specifically including following steps:

S21: calculating an upper boundary B1 of the feasible region and vertexes thereof; assuming that an upper boundary of the feasible region surrounded by L constraint lines $\omega_{ij}=(\tau_j(t_l^{id})-\theta_{ij})/lT$ has P vertexes, when the node j receives a $(L+1)^{th}$ synchronization packet from i, generating a new constraint line $\omega_{ij}=(\tau_j(t_{L+1}^{id})-\theta_{ij})/(L+1)T$, comparing the new constraint line with the P vertexes on the original boundary B1, obtaining new upper boundary vertexes;

S22: calculating a lower boundary B2 of the feasible region and vertexes thereof, similar to S21, when the node j receives a $(L+1)^{th}$ synchronization packet from i, generating a new constraint line $\omega_{ij}=(\tau_j(t_{L+1}^{id})-D-\theta_{ij})/(L+1)T$, comparing the new constraint line with the Q vertexes on the original lower boundary B2, obtaining new lower boundary vertexes;

S23: comparing the upper boundary vertexes with the lower boundary vertexes, obtaining available boundary vertexes, and new B1, B2 corresponding thereto, and substituting values of the boundary vertexes into an objective function z, so $\omega_{ij}$ corresponding to a vertex in the case where the objective function z is maximum is a relative frequency offset value under iterative maximum likelihood estimation.

Further, in step S21, obtaining new upper boundary vertexes specifically comprises: first, checking whether $$-\frac{\theta_{ij}}{\tau_i(t_L^i)} + \frac{\tau_j(t_L^j)}{\tau_i(t_L^i)} < \omega_{ij\_1}^u$$

is true when $\theta_{ij}=\theta_{ij\_min}$, where $\theta_{ij\_min}$ represents a priori minimum value of $\theta_{ij}$; if not, ignoring the new constraint line; if so, checking whether $$-\frac{\theta_{ij}}{\tau_i(t_L^i)} + \frac{\tau_j(t_L^{id})}{\tau_i(t_L^i)} < \omega_{ij\_p}^u$$

is true when $p=2, \ldots, P$, $\theta_{ij}=\theta_{ij\_p}^u$, where $\theta_{ij\_p}^u$ and $\omega_{ij\_p}^u$ respectively represent abscissa and ordinate values of a $p^{th}$ vertex of the upper boundary B1; if all cases are true, constructing a new boundary B1 by the new constraint line, boundary vertexes being $$c_1^u = (\theta, \frac{\theta_{ij\_min}}{\tau_i(t_L^i)\frac{\tau_j(t_L^{id})}{\tau_i(t_L^i)_{ij\_min}}}), c_2^u = (\theta \frac{\theta_{ij\_max}}{\tau_i(t_L^i)\frac{\tau_j(t_L^{id})}{\tau_i(t_L^i)_{ij\_max}}}); \text{if}$$

$$-\frac{\theta_{ij\_p}^u}{\tau_i(t_L^i)} + \frac{\tau_j(t_L^{id})}{\tau_i(t_L^i)} < \omega_{ij\_p}^u$$

is not true when $p \geq \tilde{p}$, the new constraint line intersects a connecting line between a $(\tilde{p}-1)^{th}$ vertex and a $(\tilde{p})^{th}$ vertex of the original boundary B1, coordinates $(\theta_{ij\_x}^u, \omega_{ij\_x}^u)$ of an intersection point satisfying:

$$\begin{cases} \omega_{ij\_x}^u = \frac{\theta_{ij\_x}^u - \theta_{ij\_\tilde{p}}^u}{\theta_{ij\_\tilde{p}-1}^u - \theta_{ij\_\tilde{p}}^u}(\omega_{ij\_\tilde{p}-1}^u - \omega_{ij\_\tilde{p}}^u) + \omega_{ij\_\tilde{p}}^u \\ \omega_{ij\_x}^u = \frac{\theta_{ij\_x}^u}{\tau_i(t_L^i)} + \frac{\tau_i(t_L^{id})}{\tau_i(t_L^i)} \end{cases};$$

the new boundary B1 has $P-\tilde{p}+3$ vertexes, where $$c_1^u = (\theta \frac{\theta_{ij\_min}}{\tau_i(t_L^i)\frac{\tau_j(t_L^{id})}{\tau_i(t_L^i)_{ij\_min}}}), c_2^u = (\theta_{ij\_x}^u, \omega_{ij\_x}^u)$$

replace the first $\tilde{p}-1$ vertexes of the original boundary B1.

The present invention has following advantageous effects:

1) Compared with an existing consensus-based clock synchronization mechanism under bounded time delay, the present invention has the advantages that distribution characteristics of communication time delay between nodes in the wireless sensor network are fully considered, not only considering fixed time delay, but also considering exponential distribution random time delay, and the maximum likelihood estimation method is applied to a frequency offset estimation process, making the estimated relative frequency offset more accurate, thus effectively improving consensus-based clock synchronization performance.

2) Compared with a common clock synchronization protocol under exponential time delay, the present invention has the advantages that bounded characteristics of time delay are considered, for truncated exponential random time delay, according to boundary constraints of the time delay, in the frequency offset estimation process, a characteristic that distributed nodes periodically broadcast clock synchronization messages is fully utilized, solving of maximum likelihood estimation is converted into a simpler linear objective function optimization problem, and an iterative comparison method is designed, so that the nodes can obtain frequency offset estimation values without storing all received clock information, thereby reducing storage overheads of the nodes.

3) A clock exchange mode of the present invention is based on unidirectional broadcast, there is no need to specify any reference node, each node in the fully distributed network executes a same clock synchronization algorithm, so there is no need to design separately for individual nodes, having good robustness and extendibility.

Other advantages, objectives and features of the present invention will be illustrated in the following description to some extent, and will be apparent to those skilled in the art based on the following investigation and research to some extent, or can be taught from the practice of the present invention. The objectives and other advantages of the present invention can be realized and obtained through the following description.

DESCRIPTION OF THE DRAWINGS

To enable the purpose, the technical solution and the advantages of the present invention to be more clear, the present invention will be preferably described in detail below in combination with the drawings, wherein.

DETAILED DESCRIPTION OF THE INVENTION

Embodiments of the present invention are described below through specific embodiments. Those skilled in the art can understand other advantages and effects of the present invention easily through the disclosure of the description. The present invention can also be implemented or applied through additional different specific embodiments. All details in the description can be modified or changed based on different perspectives and applications without departing from the spirit of the present invention. It should be noted that the figures provided in the following embodiments only exemplarily explain the basic conception of the present invention, and if there is no conflict, the following embodiments and the features in the embodiments can be mutually combined.

Figure 1:
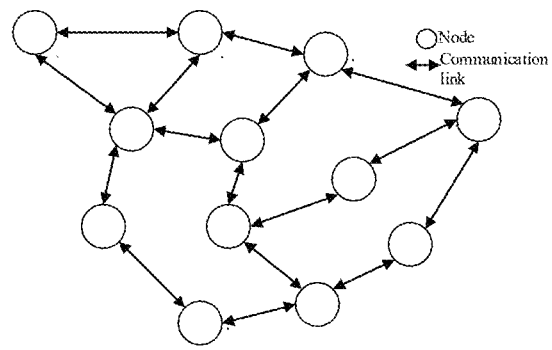
FIG. 1 is a diagram showing a communication topology of a fully distributed network.

Referring to FIGS. 1-4, FIG. 1 is a diagram showing a communication topology of a distributed network used in the present invention. As shown in FIG. 1, nodes are randomly distributed in a network, wherein each node broadcasts local clock messages thereof and receives information about other nodes within a communication range thereof. A communication exchange topology of the wireless sensor network may be modeled as a strongly connected graph G=(N,E), where N={1, 2, . . . , n} represents a set of nodes in the network, E represents a set of reliable communication links, for example, (i,j)∈E represents that a node j can successfully receive information from a node i. A neighbor node of the node i is represented as $N_i$={j∈N: (i,j)∈E}.

Figure 2:
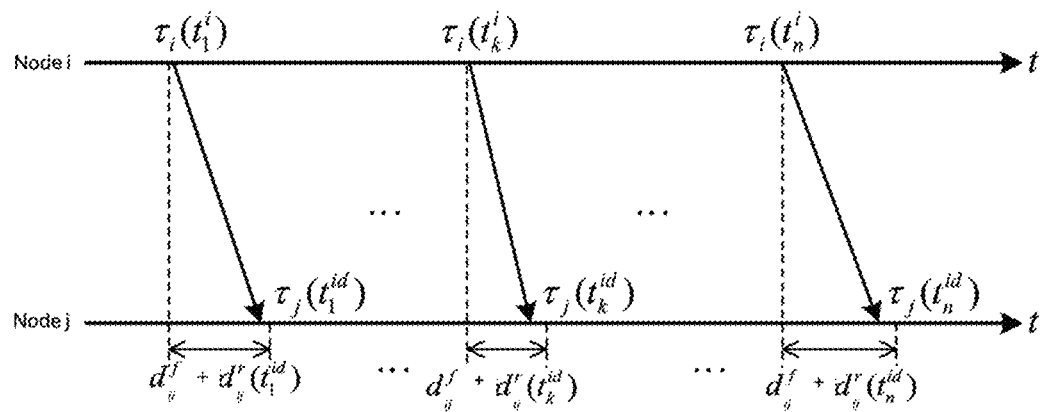
FIG. 2 is a schematic diagram of a synchronization clock information exchange mechanism between nodes.

A synchronization clock information exchange mechanism between nodes is shown in FIG. 2, taking two nodes as an example, the node i broadcasts local clock information $\tau_i(t_i^i)$ over a cycle T, the neighbor node j of the node receives clock messages and records a current local clock $\tau_j(t_i^{id})$ thereof. The neighbor node establishes a relative clock relationship according to known local clock information and time delay due to influence of fixed time delay $d_{ij}^f$ and random time delay $d_{ij}^r(t_i^i)$ existing in a data packet transmission process, $$\tau_j(t_i^{id}) = \omega_{ij}\tau_i(t_i^i) + \varphi_{ij} + d_{ij}^f + d_{ij}^r(t_i^i)$$

where $\omega_{ij}$ and $\varphi_{ij}$ respectively represent a relative frequency offset and a relative phase offset of the node i with respect to node j, $d_{ij}^r$ represents communication time delay satisfying truncated exponential distribution.

After receiving synchronization messages, according to the relative clock relationship, the neighbor node j obtains:

$$d_{ij}^r(t_i^i) = \tau_j(t_i^{id}) - \omega_{ij}\tau_i(t_i^i) - \varphi_{ij} - d_{ij}^f \quad (1)$$

When the node j receives L synchronization messages from the node i, because the random delay are mutually independent truncated exponential distribution variables, a joint probability density function of the random time delay $d_{ij}^r$ is:

$$f_d(d_{ij}^r) = \prod_{l=1}^{L} \frac{\lambda \exp(-\lambda d_{ij}^r(t_l^i))}{1 - \exp(-\lambda D)}, \quad (2)$$

$$\begin{cases} 0 \le d_{ij}^r(t_1^i) \le D \\ 0 \le d_{ij}^r(t_2^i) \le D \\ \vdots \\ 0 \le d_{ij}^r(t_L^i) \le D \end{cases}$$

(1) is substituted into (2), obtaining a likelihood function with respect to the known local clocks and the parameters to be estimated:

$$f_{\tau_j}(\tau_j) = \frac{\lambda^L}{(1 - \exp(-\lambda D))^L} \exp\left(-\lambda\left(\sum_{l=1}^{L} \tau_j(t_l^{id}) - L\theta_{ij} - \omega_{ij}\sum_{l=1}^{L} \tau_i(t_l^i)\right)\right), \quad (3)$$

$$\begin{cases} 0 \le \tau_j(t_1^{id}) - \theta_{ij} - \omega_{ij}\tau_i(t_1^i) \le D \\ 0 \le \tau_j(t_2^{id}) - \theta_{ij} - \omega_{ij}\tau_i(t_2^i) \le D \\ \vdots \\ 0 \le \tau_j(t_L^{id}) - \theta_{ij} - \omega_{ij}\tau_i(t_L^i) \le D \end{cases}$$

where $\theta_{ij} = \varphi_{ij} + d_{ij}^f$. The maximum likelihood estimation is to find parameters under the condition of satisfying the constraints so that equation (3) is maximized, that is, $\exp(-\lambda (\Sigma_{l=1}^{L}\tau_j(t_l^{id}) - L\theta_{ij} - \omega_{ij}\Sigma_{l=1}^{L}\tau_i(t_l^i)))$ is maximized. Under the maximum likelihood estimation method, the relative frequency offset $\omega_{ij}$ between nodes is:

$$\hat{\omega}_{ij} = \underset{\omega_{ij},\theta_{ij}}{\operatorname{argmax}} \exp\left(L\theta_{ij} + \omega_{ij}\sum_{l=1}^{L}\tau_i(t_l^i)\right), \quad (4)$$

$$\begin{cases} 0 \le \tau_j(t_1^{id}) - \theta_{ij} - \omega_{ij}\tau_i(t_1^i) \le D \\ 0 \le \tau_j(t_2^{id}) - \theta_{ij} - \omega_{ij}\tau_i(t_2^i) \le D \\ \vdots \\ 0 \le \tau_j(t_L^{id}) - \theta_{ij} - \omega_{ij}\tau_i(t_L^i) \le D \end{cases}$$

Nodes periodically broadcast clock synchronization messages, so a number of local clocks of the broadcast nodes is an integral multiple of a broadcast cycle T, i.e. $\tau_i(t_l^i) = lT$. Thus, solving of the relative frequency offset $\omega_{ij}$ under maximum likelihood estimation may be converted into an optimization problem:

$$\max z = \theta_{ij} + \frac{L+1}{2}T\omega_{ij}, \quad (5)$$

-continued $$\begin{cases} 0 < \tau_j(t_1^{id}) - \theta_{ij} - T\omega_{ij} \le D \\ 0 < \tau_j(t_2^{id}) - \theta_{ij} - 2T\omega_{ij} \le D \\ \vdots \\ 0 < \tau_j(t_L^{id}) - \theta_{ij} - LT\omega_{ij} \le D \end{cases}$$

Figure 3:
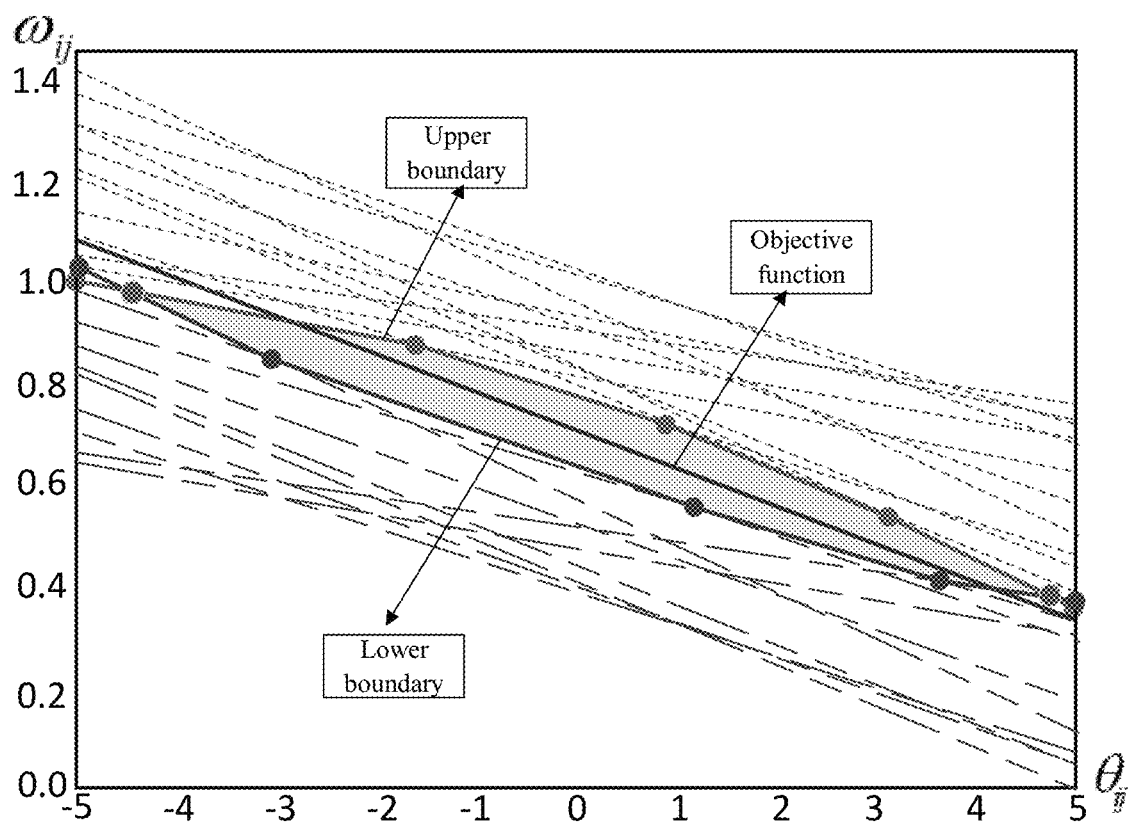
FIG. 3 is a schematic diagram showing linear programming of the frequency offset estimation method of the present invention.

The estimation problem of the relative frequency offset under the maximum likelihood estimation method is a maximum value problem of a linear objective function with linear constraints, a feasible region of the objective function is a common region under constraint lines $\omega_{ij}=(\tau_j(t_l^{id})-\theta_{ij})/lT$ and above constraint lines $\omega_{ij}=(\tau_j(t_l^{id})-D-\theta_{ij})/lT$. Therefore, with the increase of the number of synchronization information packets, the number of constraint lines is increased, and more information is required to be stored by the neighbor node. However, as shown in FIG. 3, not every constraint line is useful for constructing the feasible region, so there is a need to construct an efficient algorithm to simplify estimation solving and reduce storage overhead. Because this is a linear objective function with linear constraints, an optimal value must be located at a vertex of a boundary of the feasible region. Thus, by comparing intersection points of the constraint lines, only information of vertexes on the boundary is stored using an iterative method so as to reduce storage overhead, specifically including following steps:

Step 1: Discussing an upper boundary B1 of the feasible region and vertexes thereof; assuming that an upper boundary of the feasible region surrounded by L constraint lines $\omega_{ij}=(\tau_j(t_l^{id})-\theta_{ij})/lT$ has P vertexes, when the node j receives a $(L+1)^{th}$ synchronization packet from i, generating a new constraint line $\omega_{ij}=(\tau_j(t_{L+1}^{id})-\theta_{ij})/(L+1)T$. First, checking whether $$-\frac{\theta_{ij}}{\tau_i(t_L^i)} + \frac{\tau_j(t_L^j)}{\tau_i(t_L^i)} < \omega_{ij\_1}^u$$

is true when $\theta_{ij}=\theta_{ij\_min}$. If not, ignoring this constraint line, because the feasible region is located below all constraint lines $$\omega_{ij} = -\frac{\theta_{ij}}{\tau_i(t_l^i)} + \frac{\tau_j(t_l^{id})}{\tau_i(t_l^i)}$$

and an absolute value of a slope of the new constraint line is smaller and smaller, if so, checking whether $$-\frac{\theta_{ij}}{\tau_i(t_L^i)} + \frac{\tau_j(t_L^{id})}{\tau_i(t_L^i)} < \omega_{ij\_p}^u$$

is true when $p=2, \ldots, P$, $\theta_{ij}=\theta_{ij\_p}^u$. If all cases are true, constructing a new boundary B1 by the new constraint line, boundary vertexes being $$c_1^u = \left(\theta - \frac{\theta_{ij\_min}}{\tau_i(t_L^i)\frac{\tau_j(t_L^{id})}{\tau_i(t_L^i)}_{ij\_min}}\right), c_2^u = \left(\theta - \frac{\theta_{ij\_max}}{\tau_i(t_L^i)\frac{\tau_j(t_L^{id})}{\tau_i(t_L^i)}_{ij\_max}}\right)$$

If $$-\frac{\theta_{ij\_\tilde{p}}^u}{\tau_i(t_L^i)} + \frac{\tau_j(t_L^{id})}{\tau_i(t_L^i)} < \omega_{ij\_\tilde{p}}^u$$

is not true when $p \ge \tilde{p}$, the new constraint line intersects a connecting line between a $(\tilde{p}-1)^{th}$ vertex and a $(\tilde{p})^{th}$ vertex of the original boundary B1, coordinates $(\theta_{ij\_x}^u, \omega_{ij\_x}^u)$ of an intersection point satisfying:

$$\begin{cases} \omega_{ij\_x}^u = \frac{\theta_{ij\_x}^u - \theta_{ij\_\tilde{p}}^u}{\theta_{ij\_\tilde{p}-1}^u - \theta_{ij\_\tilde{p}}^u}(\omega_{ij\_\tilde{p}-1}^u - \omega_{ij\_\tilde{p}}^u) + \omega_{ij\_\tilde{p}}^u \\ \omega_{ij\_x}^u = \frac{\theta_{ij\_x}^u}{\tau_i(t_L^i)} + \frac{\tau_j(t_L^{id})}{\tau_i(t_L^i)} \end{cases}$$

the new boundary B1 has $P-\tilde{p}+3$ vertexes, where $$c_1^u = \left(\theta - \frac{\theta_{ij\_min}}{\tau_i(t_L^i)\frac{\tau_j(t_L^{id})}{\tau_i(t_L^i)}_{ij\_min}}\right), c_2^u = \left(\theta_{ij\_x}^u, \omega_{ij\_x}^u\right)$$

replace the first $\tilde{p}-1$ vertexes of the original boundary B1.

S22: Discussing a lower boundary B2 of the feasible region and vertexes thereof, similar to Step 1, when the node j receives a $(L+1)^{th}$ synchronization packet from i, generating a new constraint line $\omega_{ij}=(\tau_j(t_{L+1}^{id})-D-\theta_{ij})/(L+1)T$, comparing the new constraint line with the Q vertexes on the original lower boundary B2, obtaining new lower boundary vertexes.

Step 3: forming a boundary of the feasible region by a common region between the boundary B1 and the boundary B2, comparing vertexes on B1 with vertexes on B2 in combination with a relative position relationship between B1 and B2, obtaining available boundary vertexes.

After analyzing all influence of the new constraint line on the feasible region and obtaining the new boundary vertexes of the feasible region, coordinate values of the new boundary vertexes are substituted into an objective function $z=\theta_{ij}+(L+1)\tau\omega_{ij}/2$, so $\omega_{ij}$ corresponding to a vertex in the case where $\omega_{ij}$ is maximum is a relative frequency offset value under iterative maximum likelihood estimation. The estimated relative frequency offset may be used in subsequent logic clock compensation.

Embodiments

Figure 4:
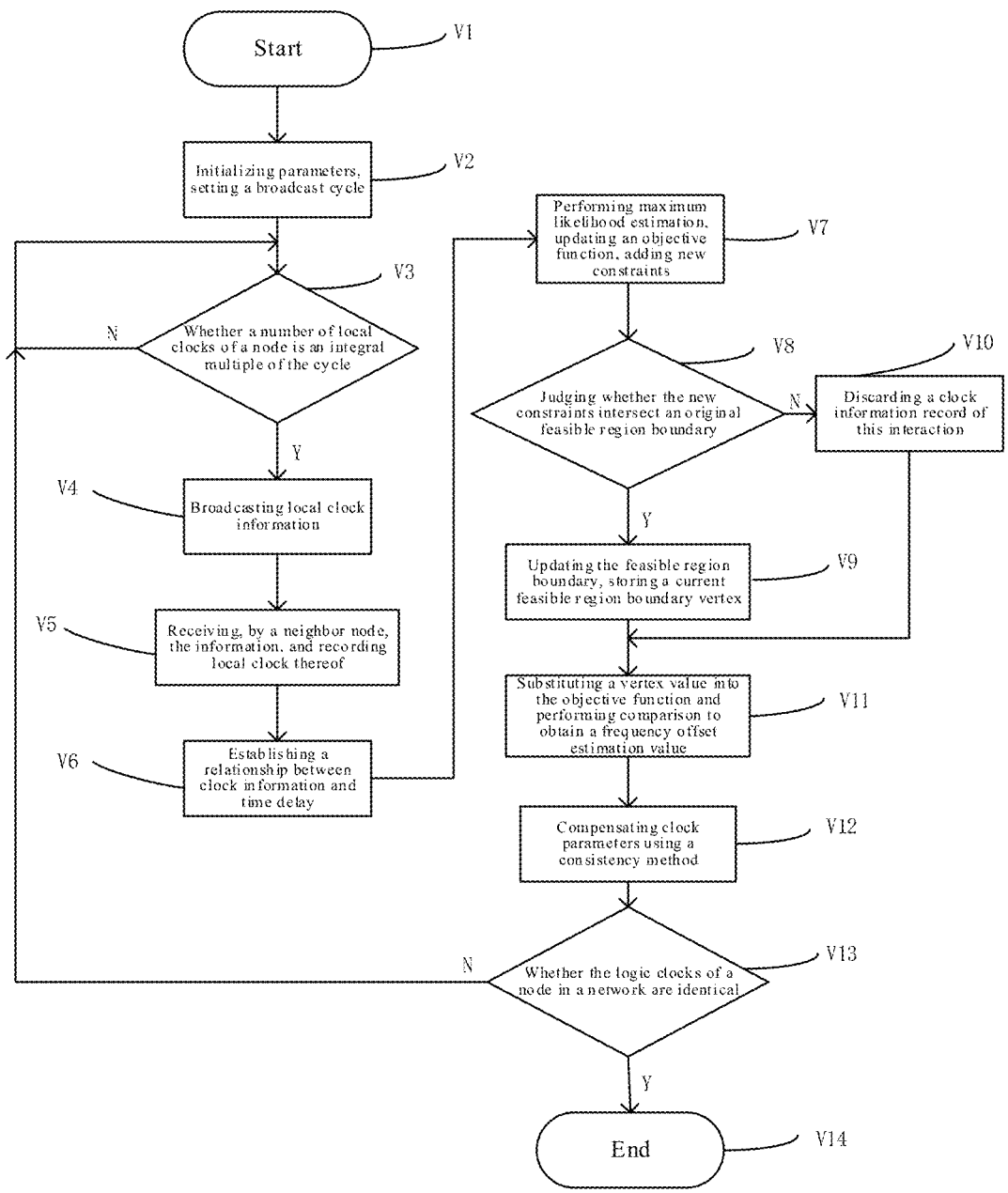
FIG. 4 is a flow chart of the frequency offset estimation method of the present invention.

FIG. 4 is a flow chart of the frequency offset estimation method for average consensus-based clock synchronization of the present invention. This embodiment provides a maximum likelihood estimation-based relative frequency offset estimation method for average consensus-based synchronization, as shown in the figure, specifically comprising following steps:

V1: starting a synchronization process.

V2-V4: Initializing message broadcast cycles, determining, by a node, whether a broadcast condition is met, if so, broadcasting clock synchronization messages, otherwise waiting until the condition is met.

V5-V6: Receiving and recording, by a neighbor node, a local clock thereof, analyzing a relative clock relationship between nodes.

V7-V10: Performing, by the neighbor node, maximum likelihood estimation of a relative frequency offset according to a new clock relationship, updating a likelihood function, that is, updating the objective function and constraints, and comparing same with existing boundary position information to update the feasible region.

V11: Comparing vertex values of the feasible region, obtaining a relative frequency offset under maximum likelihood estimation.

V12: Performing clock parameter compensation using an average consensus-based synchronization method.

V13-V14: Judging whether a synchronization termination condition is met, ending if synchronization is achieved, otherwise, monitoring clock information, updating estimation, compensation and other operations, until the synchronization termination condition is met.

Finally, it should be noted that the above embodiments are only used for describing, rather than limiting the technical solution of the present invention. Although the present invention is described in detail with reference to the preferred embodiments, those ordinary skilled in the art shall understand that the technical solution of the present invention can be amended or equivalently replaced without departing from the purpose and the scope of the technical solution. The amendment or equivalent replacement shall be covered within the scope of the claims of the present invention.

The invention claimed is:

1. A frequency offset estimation method for average consensus-based clock synchronization, specifically comprising following steps:

S1: assuming that each node i in a network periodically broadcasts a local clock message $\tau_i(t_1^i)$, receiving, by a neighbor node j thereof, the clock message, recording a current local clock $\tau_j(t_1^{id})$ of the neighbor node, so the neighbor node establishes a relative clock relationship according to known local clock information and time delay:

$$\tau_j(t_1^{id}) = \omega_{ij}\tau_i(t_1^i) + \varphi_{ij} + d_{ij}^f + d_{ij}^r(t_1^i)$$

where $\omega_{ij}$ and $\varphi_{ij}$ respectively represent a relative frequency offset and a relative phase offset of the node i with respect to the node j, $d_{ij}^r(t_1^i)$ represents random communication time delay satisfying truncated exponential distribution of which an average value is $\lambda$ and an upper limit is D; $d_{ij}^f$ represents fixed time delay existing in a data packet transmission process;

S2: performing relative frequency offset estimation according to the relative clock relationship after the neighbor node j receives synchronization messages each cycle, wherein the node j receives L synchronization messages from the node i, the relative frequency offset $\omega_{ij}$ between nodes is estimated using a maximum likelihood estimation method:

$$\hat{\omega}_{ij} = \underset{\omega_{ij},\theta_{ij}}{\mathrm{argmax}} \, \exp\left(L\theta_{ij} + \omega_{ij}\sum_{l=1}^{L}\tau_i(t_l^i)\right),$$

$$\begin{cases} 0 < \tau_j(t_1^{id}) - \theta_{ij} - \omega_{ij}\tau_i(t_1^i) \leq D \\ 0 < \tau_j(t_2^{id}) - \theta_{ij} - \omega_{ij}\tau_i(t_2^i) \leq D \\ \vdots \\ 0 < \tau_1(t_L^{id}) - \theta_{ij} - \omega_{ij}\tau_i(t_L^i) \leq D \end{cases}$$

where $\theta_{ij} = \varphi_{ij} + d_{ij}^f$.

2. The frequency offset estimation method for average consensus-based clock synchronization according to claim 1, characterized in that: in step S2, nodes in the network periodically broadcast clock synchronization messages, a number of local clocks of the broadcast nodes is an integral multiple of a broadcast cycle T, so solving of the relative frequency offset $\omega_{ij}$ under maximum likelihood estimation is converted into a linear optimization problem:

$$\max z = \theta_{ij} + \frac{L+1}{2}T\omega_{ij},$$

$$\begin{cases} 0 < \tau_j(t_1^{id}) - \theta_{ij} - T\omega_{ij} \leq D \\ 0 < \tau_j(t_2^{id}) - \theta_{ij} - 2T\omega_{ij} \leq D \\ \vdots \\ 0 < \tau_j(t_L^{id}) - \theta_{ij} - LT\omega_{ij} \leq D \end{cases}.$$

3. The frequency offset estimation method for average consensus-based clock synchronization according to claim 2, characterized in that: the estimation problem solving of the relative frequency offset under the maximum likelihood estimation method is simplified to a linear objective function with linear constraints, a feasible region of the objective function is a common region under constraint line $\omega_{ij}=(\tau_j(t_l^{id})-\theta_{ij})/lT$ and above constraint line $\omega_{ij}=(\tau_j(t_l^{id})-D-\theta_{ij})/lT$, the two cluster of constraint lines being formed according to a truncated boundary of time delay, an optimal value is located on a vertex of a feasible region boundary; by comparing intersection points of the constraint lines, only information of vertexes on the boundary is stored using an iterative method so as to reduce storage overhead, specifically including following steps:

S21: calculating an upper boundary B1 of the feasible region and vertexes thereof; assuming that an upper boundary of the feasible region surrounded by L constraint lines $\omega_{ij}=(\tau_j(t_l^{id})-\theta_{ij})/lT$ has P vertexes, when the node j receives a $(L+1)^{th}$ synchronization packet from i, generating a new constraint line $\omega_{ij}=(\tau_j(t_{L+1}^{id})-\theta_{ij})/(L+1)T$, comparing the new constraint line with the P vertexes on the original boundary B1, obtaining new upper boundary vertexes;

S22: calculating a lower boundary B2 of the feasible region and vertexes thereof, similar to S21, when the node j receives a $(L+1)^{th}$ synchronization packet from i, generating a new constraint line $\omega_{ij}=(\tau_j(t_{L+1}^{id})-\theta_{ij})/(L+1)T$, comparing the new constraint line with the Q vertexes on the original lower boundary B2, obtaining new lower boundary vertexes;

S23: comparing the upper boundary vertexes with the lower boundary vertexes, obtaining available boundary vertexes, and new B1, B2 corresponding thereto, and substituting values of the boundary vertexes into an objective function z, so $\omega_{ij}$ corresponding to a vertex in the case where the objective function z is maximum is a relative frequency offset value under iterative maximum likelihood estimation.

4. The frequency offset estimation method for average consensus-based clock synchronization according to claim 3, characterized in that: in step S21, obtaining new upper boundary vertexes specifically comprises: first, checking whether $$-\frac{\theta_{ij}}{\tau_i(t_L^i)} + \frac{\tau_j(t_L^j)}{\tau_i(t_L^i)} < \omega_{ij\_1}^u$$

is true when $\theta_{ij}=\theta_{ij\_min}$, where $\theta_{ij\_min}$ represents a priori minimum value of $\theta_{ij}$; if not, ignoring new constraint line; if so, checking whether $$-\frac{\theta_{ij}}{\tau_i(t_L^i)} + \frac{\tau_j(t_L^{id})}{\tau_i(t_L^i)} < \omega_{ij\_p}^u$$

is true when $p=2, \ldots P$, $\theta_{ij}=\theta_{ij\_p}^u$, where $\theta_{ij\_p}^u$ and $\omega_{ij\_p}^u$ respectively represent abscissa and ordinate values of a $p^{th}$ vertex of the upper boundary B1; if all cases are true, constructing a new boundary B1 by the new constraint line, boundary vertexes being $$c_1^u = (\theta - \frac{\theta_{ij\_min}}{\tau_i(t_L^i)\frac{\tau_j(t_L^{id})}{\tau_i(t_L^i)_{ij\_min}}},$$

$$c_2^u = (\theta - \frac{\theta_{ij\_max}}{\tau_i(t_L^i)\frac{\tau_j(t_L^{id})}{\tau_i(t_L^i)_{ij\_max}}}; \text{if}$$

$$-\frac{\theta_{ij\_p}}{\tau_i(t_L^i)} + \frac{\tau_j(t_L^{id})}{\tau_i(t_L^i)} < \omega_{ij\_p}^u$$

is not true when $p \geq \tilde{p}$, the new constraint line intersects a connecting line between a $(\tilde{p}-1)^{th}$ vertex and a $\tilde{p}^{th}$ vertex of the original boundary B1, coordinates $(\theta_{ij\_x}^u, \omega_{ij\_x}^u)$ of an intersection point satisfying:

$$\begin{cases} \omega_{ij\_x}^u = \frac{\theta_{ij\_x}^u - \theta_{ij\_\tilde{p}}^u}{\theta_{ij\_\tilde{p}-1}^u - \theta_{ij\_\tilde{p}}^u}(\omega_{ij\_\tilde{p}-1}^u - \omega_{ij\_\tilde{p}}^u) + \omega_{ij\_\tilde{p}}^u \\ \omega_{ij\_x}^u = \frac{\theta_{ij\_x}^u}{\tau_i(t_L^i)} + \frac{\tau_i(t_L^{id})}{\tau_i(t_L^i)} \end{cases};$$

the new boundary B1 has $P-\tilde{p}+3$ vertexes, where $$c_1^u = (\theta - \frac{\theta_{ij\_min}}{\tau_i(t_L^i)\frac{\tau_j(t_L^{id})}{\tau_i(t_L^i)_{ij\_min}}}, c_2^u = (\theta_{ij\_x}^u, \omega_{ij\_x}^u)$$

replace the first $\tilde{p}-1$ vertexes of the original boundary B1.

\* \* \* \* \*